(12) United States Patent
Hayek

(10) Patent No.: US 6,708,691 B1
(45) Date of Patent: Mar. 23, 2004

(54) VALVE AND OSCILLATOR FOR PRODUCING A PRESSURE WAVEFORM

(76) Inventor: Zamir Hayek, 10 Downage, London (GB), NW4 1AA (*) Notice: Subject to any disclaimer, the term of this patent is extended or adjusted under 35 U.S.C. 154(b) by 0 days.

(21) Appl. No.: 09/423,427
(22) PCT Filed: May 6, 1998
(86) PCT No.: PCT/GB98/01317
§ 371 (c)(1), (2), (4) Date: Jan. 10, 2000
(87) PCT Pub. No.: WO98/49993
PCT Pub. Date: Nov. 12, 1998

(30) Foreign Application Priority Data

May 7, 1997 (GB) .............................. 9709275

(51) Int. Cl.$^7$ ................................. A62B 9/02
(52) U.S. Cl. ............ 128/205.24; 251/283; 251/304; 137/625.21; 137/908
(58) Field of Search ............ 128/205–24; 251/205–211, 251/283, 304; 137/625–21, 908

(56) References Cited

U.S. PATENT DOCUMENTS

| | | | | |
|---|---|---|---|---|
| 4,930,498 A | * | 6/1990 | Hayek | 128/30.2 |
| 5,014,748 A | * | 5/1991 | Nogami et al. | 137/625.65 |
| 5,771,928 A | * | 6/1998 | Zepic et al. | 137/625.22 |
| 5,787,929 A | * | 8/1998 | Iwata | 137/625.43 |
| 5,950,518 A | * | 9/1999 | Pfeifer | 91/375 |
| 6,142,181 A | * | 11/2000 | Schumacher | 137/625.21 |

FOREIGN PATENT DOCUMENTS

| | | | |
|---|---|---|---|
| EP | 0373153 A2 | 6/1990 | A61H/31/02 |
| EP | 0625659 A1 | 11/1994 | F16K/11/074 |
| EP | 0651205 A1 | 5/1995 | F23L/15/02 |
| FR | 2273740 | 6/1974 | B65G/51/08 |
| GB | 2306623 | 10/1995 | A61H/31/02 |
| NL | 41582 | 9/1937 | |
| WO | WO-94/27553 | * 12/1994 | |
| WO | WO01248 | 5/1995 | A61M/16/00 |

* cited by examiner

Primary Examiner—Weilun Lo
Assistant Examiner—Darwin P Erezo
(74) Attorney, Agent, or Firm—Allston L. Jones

(57) ABSTRACT

A valve for controlling gas flow to ventilator or physiotherapy apparatus, has a body having first and second inlet ports and an outlet port. A shutter plate is rotatable with respect to said body and adapted selectively to interconnect said inlet ports to said outlet port. Said shutter plate is operable on rotation in a single sense to connect alternately said first inlet port to said outlet port and said second inlet port to said outlet port.

21 Claims, 5 Drawing Sheets

VALVE AND OSCILLATOR FOR PRODUCING A PRESSURE WAVEFORM

The present invention relates to a valve for controlling gas flow to ventilator or physiotherapy apparatus.

Examples of known valves for use in ventilation apparatus are discussed hereinbelow.

EP-A-0373153 discloses a ventilator apparatus for use in the ventilation of the lungs of a patient, which apparatus comprises a ventilator enclosure for receiving the chest region of a patient's body connected via a fluid control valve both to a positive fluid pressure source and a negative fluid pressure source. The valve comprises a main port connected to the ventilator enclosure, subsidiary ports connected to a respective one of the positive and negative pressure sources, and a shutter mechanism which alternately permits the application of positive and negative pressure to the ventilator enclosure. With this arrangement, the use of separate positive and negative pressure sources, such as a pair of gas blowers, is required. Ideally, however, for efficiency the use of a single gas blower is desired. The arrangement disclosed in EP-A-0373153 does not allow for the use of a single gas blower having its positive pressure side connected to one subsidiary port of the valve and its negative pressure side connected to the other subsidiary port of the valve since a closed loop would be created with no vent to the exterior of the valve.

WO-94/27553 discloses a fluid control valve which allows the positive and negative pressure sides of a single fluid supply to be connected to a closed system, such as a ventilator enclosure, so as to permit the generation alternately of a positive and negative pressure in the closed system. The valve comprises a valve body having first and second subsidiary ports for connection to the ventilator enclosure, and a valve means which comprises a shutter mechanism for selectively connecting either the first subsidiary port to the main port whilst blocking the connection path between the second subsidiary port and the main port, or connecting the second subsidiary port to the main port whilst blocking the connection path between the first subsidiary port and the main port. In order to permit connection to a closed system, the valve means includes a further shutter mechanism which is coupled for synchronous movement with the first-mentioned shutter mechanism so as to provide a temporary connection to the exterior of the valve from whichever of the first and second subsidiary ports is blocked off from the main port. Such an arrangement allows the use of a single fluid supply, and by the use of a shutter mechanism, which is capable of progressively closing the path between the main port and the respective subsidiary port, greater control over the shape and intensity of the positive and negative pressure pulses applied to the main port is provided. However, the arrangement cannot provide a supply of positive and negative fluid pressure at frequencies exceeding 5–6 Hz. The reason for this is that to generate alternately a positive and negative pressure at the main port requires the repeated reversal of the direction of rotation of the shutter mechanism and the frequency of operation of that valve is limited to the rate at which the direction of rotation of the control motor, and hence shutter mechanism, can be reversed. Reversal of the direction of rotation of the motor requires the motor to be brought to a stop, and this introduces an unavoidable minimum time delay. Continuous rotation of the shutter mechanism employed in the valve disclosed in WO-94/27553 is not possible since, over a sector of the rotation of the shutter mechanism, both of the subsidiary ports which are connected to the blower inlet and the blower outlet would at the same time be connected to the main port.

UK patent application No. 9522222.0 discloses a fluid control valve comprising a body having first and second ports for connection to a positive fluid pressure source and a negative fluid pressure source and an outlet port for connection to a device such as a ventilator apparatus, and a cylindrical valve member rotatable with respect to the body which is adapted selectively to interconnect the first and second ports to the outlet port. Instead of requiring a shutter mechanism which is oscillated to provide alternately a positive and negative fluid pressure at an outlet port, the cylindrical valve member is rotated continuously in a single sense. While the fluid control valve disclosed in UK patent application No. 9522222.0 can be operated at high frequencies, the valve suffers from the disadvantage that it is difficult to ensure an adequate seal between the body and the valve member. This problem arises by virtue of requiring a cylindrical valve member which for a good seal requires a perfect axial alignment of the body and the valve member; perfect axial alignment only being achievable by accurate machining of the component parts which is time-consuming.

It is therefore an object of the present invention to at least partially mitigate the disadvantages of the prior art.

An embodiment of the invention provides a valve of simple construction which is capable of operation at high frequencies.

The present invention provides a valve for for controlling gas flow to ventilator or physiotherapy apparatus, comprising a body having first and second inlet ports and an outlet port characterised by a shutter plate rotatable with respect to said body and adapted selectively to interconnect said inlet ports to said outlet port, whereby said shutter plate is operable on rotation in a single sense to connect alternately said first inlet port to said outlet port and said second inlet port to said outlet port.

The use of a shutter plate allows sealing between the plate and the body to take place over a large area. It also reduces the need for time consuming highly-accurate machining. The relatively low moment of inertia of the plate, especially where it is made of thin light metal readily allows for rapid changes of speed.

Preferably, upon one full rotation of said shutter plate, said first inlet port is coupled to said outlet port, said second inlet port is coupled to said outlet port, said first inlet port is coupled again to said outlet port and said second inlet port is coupled again to said outlet port.

Advantageously, said body comprises a first body portion defining said inlet ports and a second body portion defining said outlet ports.

Preferably, said first body portion defines two chambers, each in communication with a respective one of said inlet ports, each chamber having a respective opening, and said shutter plate cooperates with said openings to effect connection of said outlet port and said inlet ports.

Advantageously, said first body portion has a face wall portion having said openings, said face wall portion having land portions between said openings.

Conveniently said shutter plate is generally circular, has a central axis of rotation, and defines at least two plate openings for cooperation with the openings of said body, whereby communication between said outlet port is established with said inlet ports.

Advantageously, the body has a circular flange upstanding around said face wall portion, the depth of the flange corresponding substantially to a thickness of said shutter plate, and the diameter of the flange corresponding to that of the shutter plate.

By this means, the sealing performance of the shutter plate is further improved.

Advantageously, said land portions are dimensioned and disposed so that in at least one position of said shutter plate, communication between said inlet ports and said outlet port is prevented.

Preferably the valve further comprises a shaft secured to said shutter plate.

Advantageously, said valve has an electric motor for driving said shaft.

Conveniently said motor is a stepper motor.

Alternatively said motor is a servomotor.

Conveniently control circuitry is provided for said motor.

Advantageously said control circuitry has means for varying the relationship between the time for which one inlet port is connected to the outlet port and the time for which the other inlet port is connected to the outlet port.

Conveniently, the control circuitry has means for varying the speed of rotation of the shutter plate.

According to a second aspect of the invention there is provided a ventilator or physiotherapy apparatus for use in the ventilation of the lungs of a patient, comprising an enclosure for receiving at least the chest region of the patient's body, and a means for alternating the pressure in the enclosure to produce ventilation, said means comprising a positive fluid pressure source, a negative fluid pressure source and a valve comprising a body and a shutter plate, said body having first and second inlet ports and an outlet port, said shutter plate being rotatable with respect to said body and adapted selectively to interconnect said inlet ports to said outlet port, whereby said shutter plate is operable on rotation in a single sense to connect alternately said first inlet port to said outlet port and said second inlet port to said outlet port.

According to a third aspect of the invention there is provided a ventilator or physiotherapy apparatus for use in the ventilation of the lungs of a patient, comprising an enclosure for receiving at least the chest region of the patient's body, a non-positive displacement source of positive and negative gas pressure and a valve connected to said pressure source, said valve comprising a body and a shutter plate, said body having first and second inlet ports and an outlet port, said shutter plate being rotatable with respect to said body and adapted selectively to interconnect said inlet ports to said outlet port, whereby said shutter plate is operable on rotation in a single sense to connect alternately said first inlet port to said outlet port and said second inlet port to said outlet port.

Advantageously, the pressure source comprises a blower.

Preferably, upon one full rotation of said shutter plate, said first inlet port is coupled to said outlet port, said second inlet port is coupled to said outlet port, said first inlet port is coupled again to said outlet port and said second inlet port is coupled again to said outlet port.

Advantageously, said shutter plate has a first position where said first inlet port is coupled to said outlet port, a second position where said second inlet port is connected to said outlet port and a third position intermediate said first and second positions where neither inlet port is coupled to said outlet port.

Preferably, in said third position of said shutter plate, said outlet port is substantially closed.

Conveniently, the valve further comprises a shaft secured to said shutter plate.

Advantageously, said valve has an electric motor for driving said shaft.

Conveniently said motor is a stepper motor.

Alternatively said motor may be a brushless dc motor.

Conveniently control circuitry is provided for said motor.

Advantageously said control circuitry has means for varying the relationship between the time for which one inlet port is connected to the outlet port and the time for which the other inlet port is connected to the outlet port.

Conveniently, the control circuitry has means for varying the speed of rotation of the shutter plate.

Conveniently said apparatus further comprises means for varying the pressure of said pressure source.

The present invention also relates to an oscillator for producing a pressure waveform, especially in ventilator or physiotherapy apparatus.

Ventilators fall into two classes, these being intermittent negative pressure ventilators (INPV) and intermittent positive pressure ventilators (IPPV). There are two principal kinds of negative pressure ventilator used in respiratory therapy, these being the body tank respirator (commonly called the iron lung) and the cuirass. There are many kinds of positive pressure ventilator such as volume and pressure-limited ventilators.

Positive pressure ventilators have many advantages over negative pressure ventilators. Notably, in requiring at most only tracheostomy or intubation of a patient, positive pressure ventilators provide good accessibility to the patient for patient care as compared to negative pressure ventilators which require total enclosure of at least the chest of a patient.

The intermittent positive pressure ventilation techniques do however have a number of significant disadvantages. For example, intubation of a patient requires highly skilled personnel both to insert and maintain the tube, and moreover causes secretion build up in the airways which requires the airways to be cleared regularly by suction. Both the introduction of a tube and the necessary suctioning frequently causes infection, which infection together with the secretion and the positive pressure applied to the lungs results in fibrotic changes in the lung tissue and a consequential reduction in lung compliance. The use of positive pressure also causes air leakage and barotrauma to the lung, and in creating a positive intrapulmonary pressure reduces the venous return and cardiac output. Indeed, the higher the pressure needed to ventilate a patient with a sick lung the greater the reduction there will be in cardiac output, which in turn will increase morbidity and mortality.

Techniques have been developed which reduce the tidal volume required to ventilate the lungs of a patient, and hence reduce the risk of barotrauma. One such technique is high-frequency ventilation (HFV). The mechanisms of high-frequency ventilation are not clearly understood, although it is well established that using this method carbon dioxide exchange can occur with tidal volumes less than a patient's dead space. One particular high-frequency ventilation technique is high-frequency jet ventilation (HFJV) which is designed to deliver a high-pressure gas source through a small jet or cannula that is positioned in the main airway.

Such techniques however only partially alleviate the known problems. Recently, an oscillator has been devised which develops a pressure waveform capable of ventilating the lungs of a patient using a tidal volume of air so reduced as to lower the peak pressure of the cyclic pressure waveform required for ventilation and hence reduce the risk of barotrauma. This oscillator is disclosed in WO-95/32753. Whilst this oscillator does allow for the ventilation of the lungs of a patient with a reduced volume of air, it suffers from the problem that the action of the pressure waveform is not sufficient to clear satisfactorily the build-up of secretion from the airways.

It is thus a further aim of the present invention to provide an oscillator which is capable of ventilating the lungs of a patient with a reduced tidal volume and yet exhibit improved secretion clearance.

The present invention hence provides an oscillator for producing a pressure waveform, comprising a waveform generating means for producing a first, base cyclic pressure waveform having a second pressure waveform of positive pressure pulses of higher frequency superimposed thereon. The present invention hence provides an oscillator for producing a pressure waveform, comprising a waveform generating means for producing a first, base cyclic pressure waveform having a second pressure waveform of positive pressure pulses of higher frequency superimposed thereon.

Preferably, the waveform generating means comprises at least one apparatus in accordance with the third aspect of the invention.

Advantageously, the waveform generating means comprises a first apparatus in accordance with the third aspect of the invention for producing the first waveform, and a second such apparatus for producing the second pressure waveform.

Preferably, the waveform generating means comprises at least one apparatus in accordance with the third aspect of the invention.

Advantageously, the waveform generating means comprises a first apparatus in accordance with the third aspect of the invention for producing the first waveform, and a second such apparatus for producing the second pressure waveform.

With the present invention, improved secretion clearance is achieved by the superimposition of only positive pressure pulses on a base cyclic pressure waveform. It is the action of the positive pressure pulses which draws the secretion out of the airways. This contrasts with the oscillator disclosed in WO-95/32753 where a cyclic pressure waveform, i.e. a waveform comprising alternating positive and negative pressure pulses, is superimposed on another cyclic pressure waveform of lower frequency. While the action of the positive pressure pulses in that superimposed cyclic waveform is to draw secretion out of the airways this is counteracted by the action of the negative pressure pulses which is to draw the secretion back into the airways.

Preferred embodiments of the present invention will now be described, by way of example only, with reference to the accompanying drawings, in which.

Figure 8:
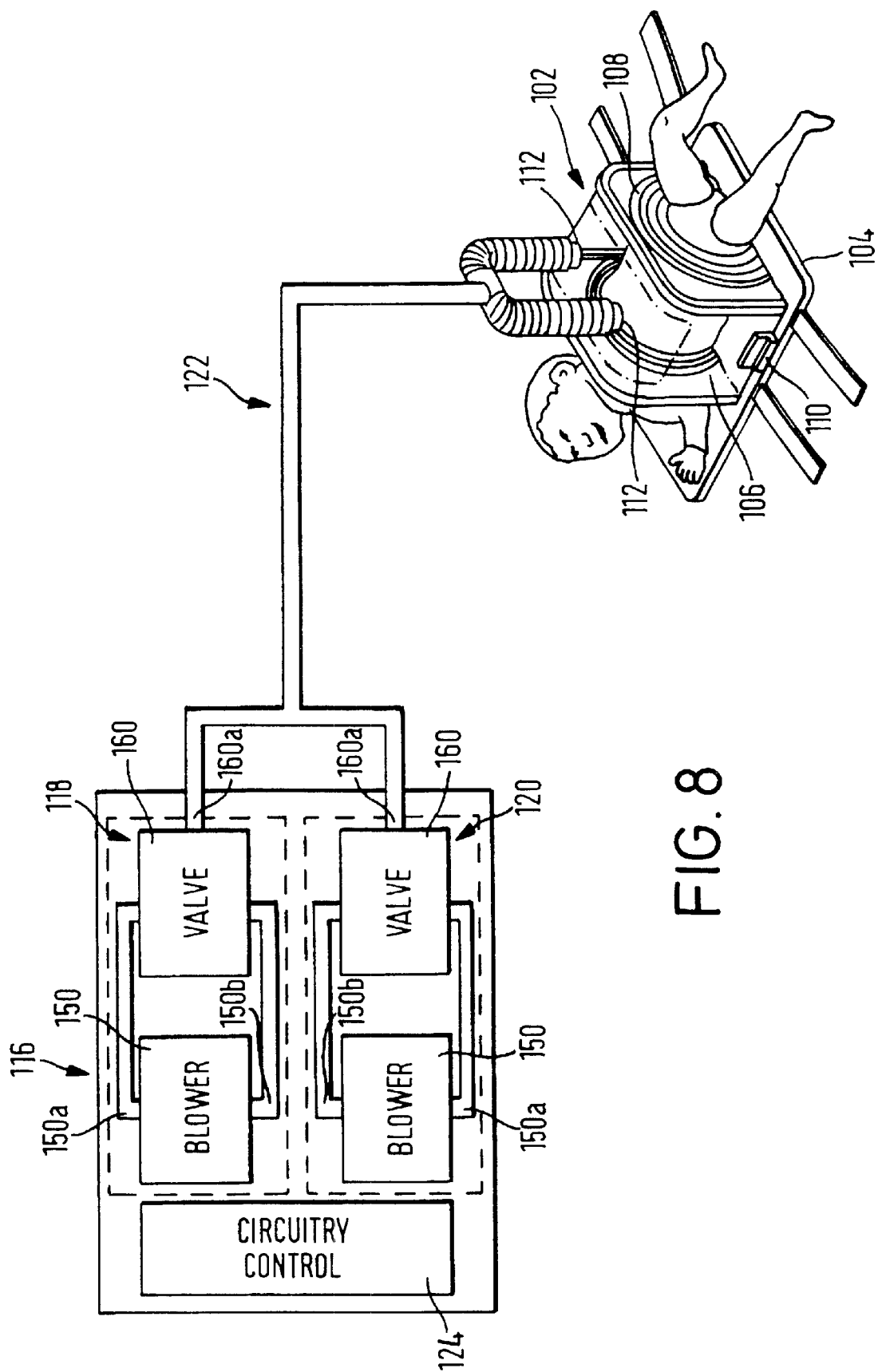
Figure 9:
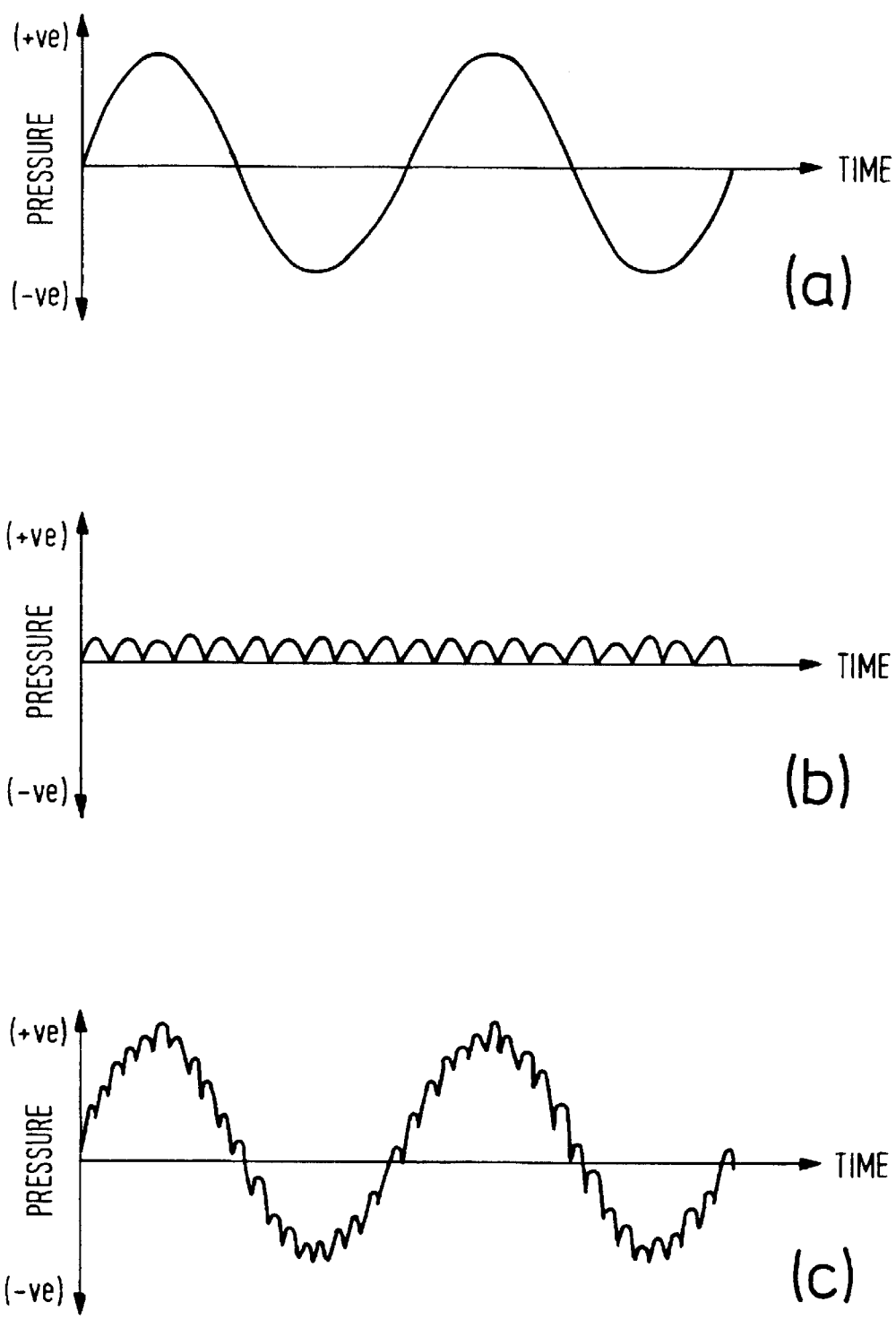

FIG. 8 illustrates in schematic a perspective view of a ventilator apparatus which incorporates an oscillator in accordance with an embodiment of the present invention; and FIGS. 9(a–c) respectively illustrate a first, base cyclic pressure waveform, a second pressure waveform of positive pulses of higher frequency and lower amplitude than the base cyclic pressure waveform, and a pressure waveform comprising the first, base cyclic waveform with the second higher-frequency pressure waveform superimposed thereon.

A valve in accordance with the present invention comprises a main body 3 and a rotary shutter plate 5. The main body 3 comprises a first body part 7 within which the shutter plate 5 is rotatable and a second body part 9 attached to the first body part 7.

The first body part 7 is a cylindrical body having a first chamber 11 and a second chamber 13 defined therein; the first and second chambers 11,13 being disposed in opposed halves and divided by a wall member 15 which extends along the diameter of the first body part 7. The first and second chambers 11,13 each respectively extend to the circumferential surface of the first body part 7 and define first and second communication ports 17,19, which are in use connected to the inlet and the outlet of a blower (not shown). The first and second chambers 11,13 also extend axially to one end surface of the first body part 7 and define a common opening 21. In this embodiment the common opening 21 is circular and includes a flange 22. The first body part 7 further comprises a plate member 23 which is fixed in the common opening 21 at the flange 22. The plate member 23 includes four sector-shaped openings 23a–d defined by four radial arm sections 25a–d having rotational symmetry. The plate member 23 is in this embodiment arranged such that two of the opposed arm sections 25a,25c are disposed along the wall member 15, whereby a first and second of the sector-shaped openings 23a,23b and a third and fourth of the sector-shaped openings 23c,23d communicate with the second and first chambers 11,13 respectively.

The second body part 9 comprises a semi-cylindrical body which is fixed, in this embodiment by bolts 27, to the surface of the first body part 9 in which the common opening 21 is defined. The second body part 9 includes a recess 29, in this embodiment a semi-circular recess, in that surface which opposes the first body part 7. The recess 29 is of such a size that when the second body part 9 is fixed to the first body part 7 the recess 29 encompasses the second and third sector-shaped openings 23b,23c of the plate member 23 and the defining upper edge 31 of the recess 29 extends above the second and fourth arm sections 25b,25d of the plate member 23. The second body part 9 further comprises a conduit 33 which communicates with the recess 29 and defines an outlet port 35 for connection to, for example, a ventilator apparatus (not shown).

The shutter plate 5, in this embodiment a thin, flat generally circular plate, is located between the outer surface of the plate member 23 of the first body part 7 and the rear surface of second body part 9. The clearances between the shutter plate 5 and the outer surface of the plate member 23 and the rear surface of the second body part 9 are such that the shutter plate 5 can be freely rotated and yet provide a seal, the leakage from which is sufficiently low that the valve can operate properly to provide the required pressures at the outlet port 35. The shutter plate 5 includes two diametrally opposed sector-shaped openings 6a,6b defined by two arm sections 5a,5b. The sector-shaped openings 6a,6b in the shutter plate 5 are each of the same size as the sector-shaped openings 23a–d in the plate member 23.

The valve further comprises a control motor 37, for example a stepper or servo motor, which is connected to the shutter plate 5 by a shaft 39 so as to control the operation of the valve. This will be described in more detail hereinbelow. In use, by operation of the motor 37, the outlet port 35 of the valve is connected in alternate succession to the inlet (negative fluid pressure source) and the outlet (positive fluid pressure source) of the blower.

Figure 1:
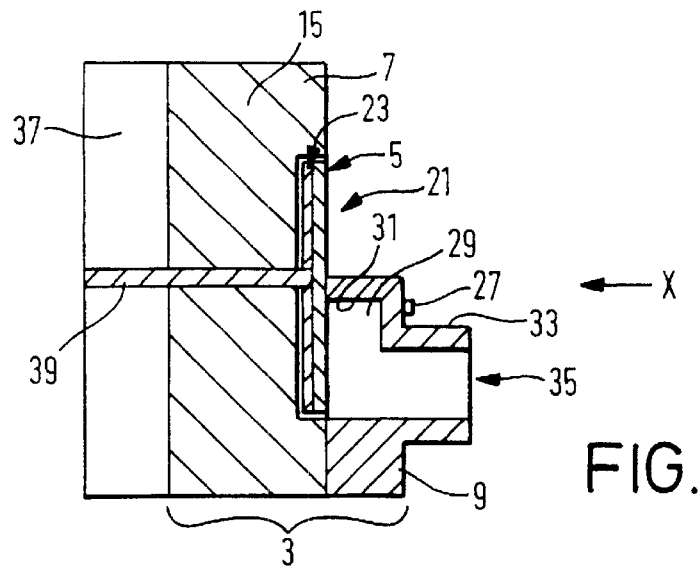
FIG. 1 illustrates a cross-sectional view along the longitudinal axis of a fluid control valve in accordance with an embodiment of the present invention, shown coupled to a control motor.
Figure 2:
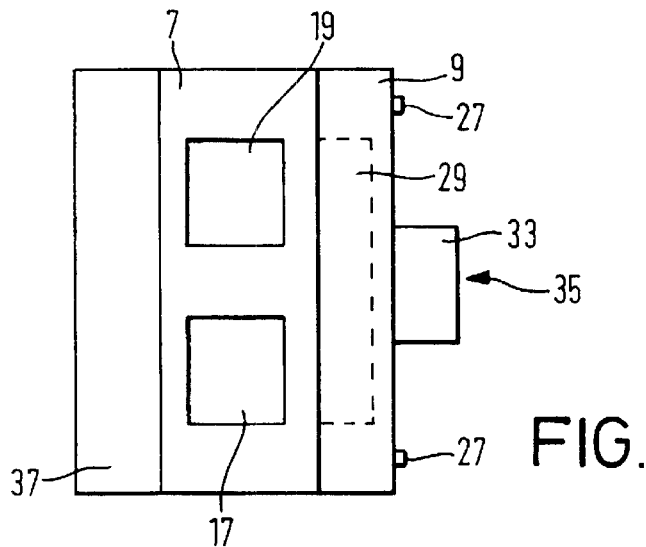
FIG. 2 illustrates a plan view of the valve and control motor illustrated in FIG. 1.
Figure 3:
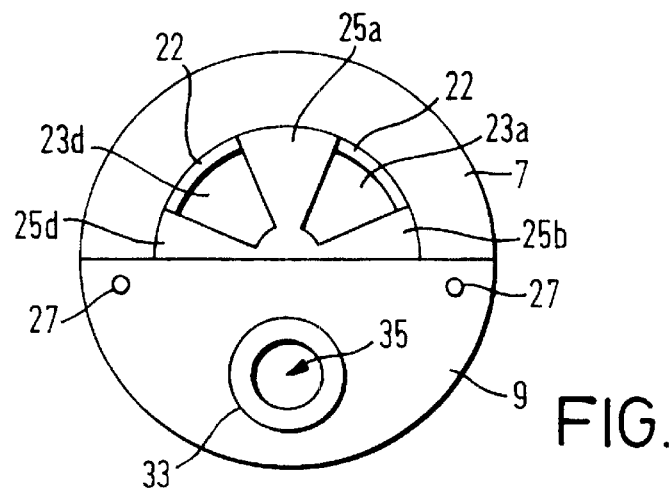
FIG. 3 illustrates a view along direction X of one end of the valve (with shutter plate removed) and control motor illustrated in FIG. 1.
Figure 4:
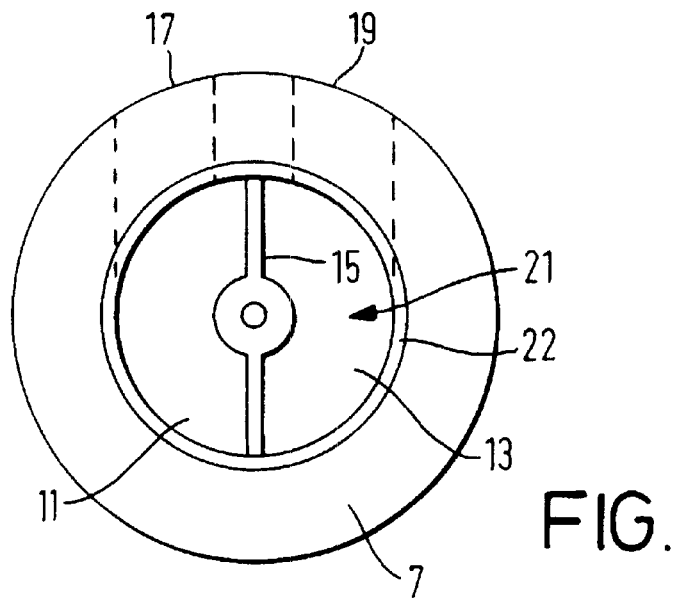
FIG. 4 illustrates a view along direction X of one end of the main body part (with plate member removed) of the valve illustrated in FIG. 1.
Figure 5:
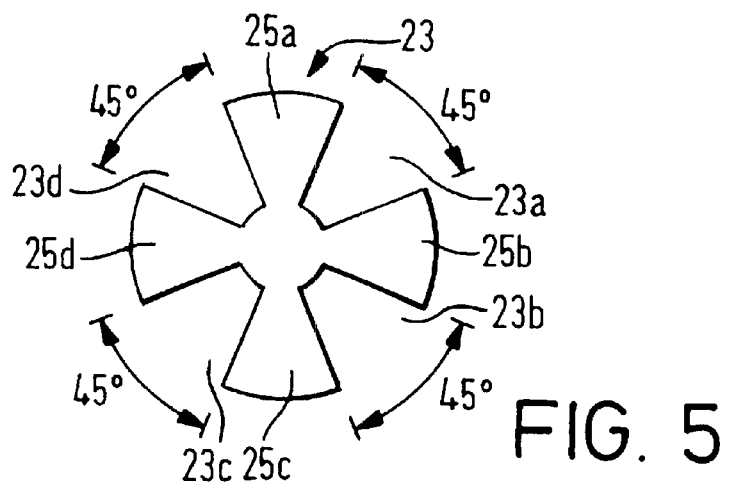
FIG. 5 illustrates a plan view of the plate member of the main body part of the valve illustrated in FIG. 1.
Figure 6:
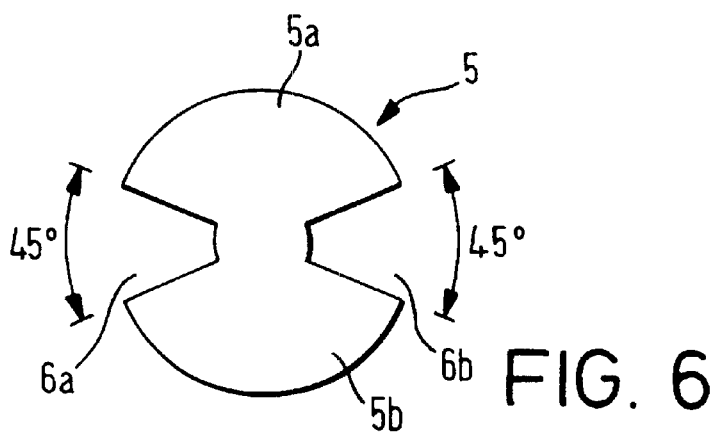
FIG. 6 illustrates a plan view of the rotatable shutter plate of the valve illustrated in FIG. 1.

In use, the shutter plate 5 of the valve is continuously rotated in a single sense, in either a clockwise or anticlockwise direction when viewed along direction X in FIG. 1. Operation of the valve over one revolution is as follows.

Starting from the position in which the first and second arm sections 5a,5b of the shutter plate 5 totally encompass and hence close the sector-shaped openings 23a–d in the plate member 23, with the first and second sector-shaped openings 6a,6b in the shutter plate 5 overlying the fourth and second arm sections 25d,25b of the plate member 23 respectively, the motor 37 is operated to rotate the shutter plate 5 in a clockwise direction when viewed along direction X as shown in FIG. 1. The arm sections 5a,5b of the shutter plate 5 are thus moved such that the fourth and second sector-shaped openings 23d,23b of the plate member 23, which open respectively to the first and second chambers 11,13 in the first body part 7, are respectively progressively opened. When the shutter plate 5 has rotated through a one-eighth turn from its original starting position, the first and second sector-shaped openings 6a,6b in the shutter plate 5 correspond exactly with the fourth and second sector-shaped openings 23d,23b in the plate member 23. In this position, the first port 17 is vented to air and the second port 19 is in communication with the outlet port 35, with the first and third sector-shaped openings 23a,23c in the plate member 23 being blocked off by the first and second arm sections 5a,5b of the shutter plate 5. Thereby, the outlet of the blower (the positive pressure side) connected to the second port 19 is in communication with the outlet port 35 and the inlet of the blower (the negative pressure side) connected to the first port 17 is vented to the exterior of the valve.

The shutter plate 5 continues to rotate in the same direction such that the first and second arm sections 5a,5b of the shutter plate 5 progressively close the second and fourth sector-shaped openings 23b,23d in the plate member 23 respectively. When the shutter plate 5 has rotated through a quarter turn from its original starting position, the sector-shaped openings 23a–d of the plate member 23 are all at that instant fully closed.

The shutter plate 5 continues to rotate in the same direction such that the third and first sector-shaped openings 23c,23a in the plate member 23, which open to the first and second chambers 11,13 of the first body part 7, are progressively opened. When the shutter plate 5 has rotated through a three-eighth turn from its original starting position, the first and second sector-shaped openings 6a,6b in the shutter plate 5 correspond exactly with the first and third sector-shaped openings 23a,23c in the plate member 23 respectively. In this position the first port 17 is in communication with the outlet port 35 and the second port 19 is vented to air, with the second and fourth sector-shaped openings 23b,23d of the plate member 23 being respectively blocked off by the first and second arm sections 5a,5b of the shutter plate 5. Thereby, the inlet of the blower is in communication with the outlet port 35 and the outlet of the blower is vented to the exterior of the valve.

The shutter plate 5 continues to rotate in the same direction such that the first and second arm sections 5a,5b of the shutter plate 5 progressively close the third and first sector-shaped openings 23c,23a in the plate member 23 respectively. When the shutter plate 5 has rotated through a half turn from its original starting position the sector-shaped openings 23a–d in the plate member 23 are all at that instant fully closed.

The shutter plate 5 continues to rotate in the same direction such that the first and second sector-shaped openings 6a,6b in the shutter plate 5 respectively progressively open the second and fourth sector-shaped openings 23b,23d in the plate member 23. When the shutter plate 5 has rotated through a five-eighth turn from its original starting position, the first and second sector-shaped openings 6a,6b in the shutter plate 5 correspond exactly with the second and fourth sector-shaped openings 23b,23d in the plate member 23 respectively. In this position, the second port 19 is in communication with the outlet port 35 and the first port 17 is vented to air, with the first and third sector-shaped openings 23a,23c in the plate member 23 being blocked off by the second and first arm sections 5a,5b of the shutter plate 5. Thereby, the outlet of the blower is in communication with the outlet port 35 and the inlet of the blower is vented to the exterior of the valve.

The shutter plate 5 continues to rotate in the same direction such that the first and second arm sections 5a,5b of the shutter plate 5 progressively close the fourth and second sector-shaped openings 23d,23b in the plate member 23 respectively. When the shutter plate 5 has rotated through a three-quarter turn from its original starting position the sector-shaped openings 23a–d of the plate member 23 are all at that instant fully closed.

The shutter plate 5 continues to rotate in the same direction such that the first and second sector-shaped openings 6a,6b in the shutter plate 5 respectively progressively open the third and first sector-shaped openings 23c,23a in the plate member 23. When the shutter plate 5 has rotated through a seven-eighth turn from its original starting position the first and second sector-shaped openings 6a,6b in the shutter plate 5 correspond exactly with the third and first sector-shaped openings 23c,23a in the plate member 23. In this position, the first port 17 is in communication with the outlet port 35 and the second port 19 is vented to air, with the second and fourth sector-shaped openings 23b,23d in the plate member 23 being blocked off by the second and first arm sections 5b, 5a of the shutter plate 5. Thereby, the inlet of the blower is in communication with the outlet port 35 and the outlet of the blower is vented to the exterior of the valve.

The shutter plate 5 continues to rotate in the same direction and the first and second arm sections 5a,5b of the shutter plate 5 progressively close the first and third sector-shaped openings 23a,23c in the plate member 23 respectively. When the shutter plate 5 has rotated through a full turn from its original starting position, i.e. has completed one revolution, the sector-shaped openings 23a–d in the plate member 23 are all at that instant fully closed.

In each half revolution of the shutter plate 5, the outlet port 35, which is coupled to, for example, a ventilator enclosure, communicates alternately once with the positive pressure side and once with the negative pressure side of the blower. Thereby, as the shutter plate 5 is continuously rotated a positive and negative pressure is alternately generated at the outlet port 35. Typically, in the operation of the valve, the time taken for the shutter plate 5 to open and close the second sector-shaped opening 23b in the plate member 23 (the positive pressure cycle) may be set to be only half that of the time taken for the shutter plate 5 to open and close the third sector-shaped opening 23c in the plate member 23 (the negative pressure cycle), in which case the duty cycle would be 1:2.

The duty cycle of the valve, which is the time that the outlet port 35 is connected to the positive pressure source in relation to the time that the outlet port 35 is connected to the negative pressure source, corresponds to the Inspiration/Expiration (I/E) ratio. In use, the duty cycle employed may be between 10:1 and 1:10. A duty cycle of 10:1 is typically used in physiotherapy, where such an I/E ratio imitates the coughing action. A duty cycle of 1:3 is typically used in ventilating the lungs of a person suffering from asthma, where a slow and controlled expiration is required.

Figure 7:
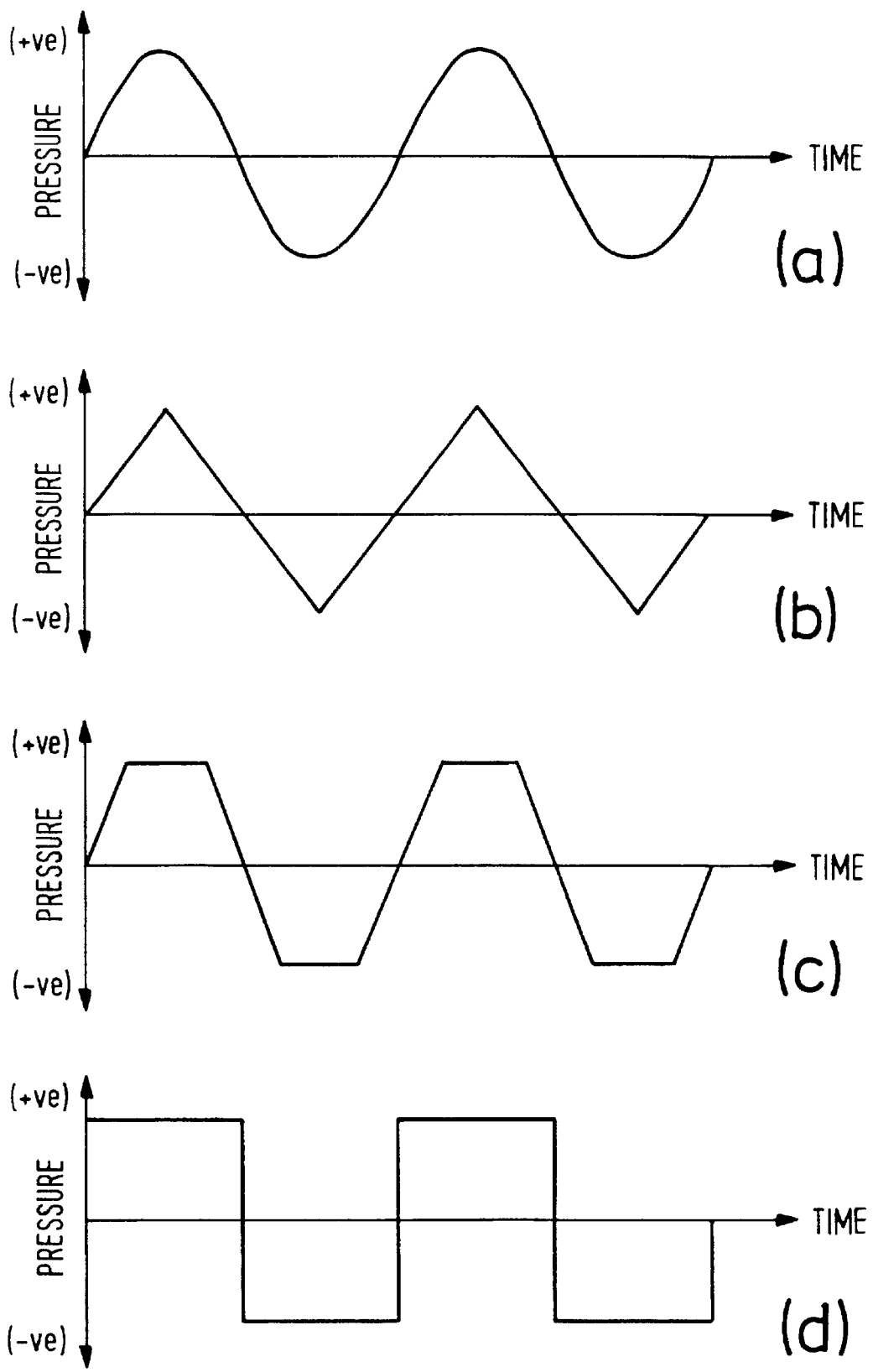
FIGS. 7(a–d) illustrate examples of the pressure waveforms which can be achieved by the valve illustrated in FIG. 1.

The valve of the present invention also permits the shape of the waveform applied to the outlet port 35 to be altered. The shape is a function of the speed of rotation of the shutter plate 5 during the phases of rotation of the shutter plate 5 corresponding to the positive and negative pressure cycles, and the pressure developed by the blower. Examples of the shapes of the pressure waveforms which can be achieved by the valve of the present invention are sinusoidal, saw-tooth, trapezoidal and square/rectangular. FIG. 7(a) illustrates a sinusoidal waveform, which waveform can be achieved by operation of the valve at a duty cycle of 1:1, with the shutter plate 5 operated at a fixed continuous speed. FIG. 7(b) illustrates a saw-tooth waveform, which waveform can be achieved by operation of the valve at a 1:1 duty cycle, with the speed of rotation of the shutter plate 5 during the positive and negative pressure cycles being increased to a maximum at the mid-point of the positive/negative pressure cycles and decreased at the same rate to the end of the positive/negative pressure cycles. FIG. 7(c) illustrates a trapezoidal waveform, which waveform can be achieved by operation of the valve at a duty cycle of 1:1, with the speed of rotation of the shutter plate 5 being controlled such that at the beginning and the end of the positive and negative pressure cycles the speed of rotation of the shutter plate 5 is kept high and during the intermediate phase of the positive and negative pressure cycles the speed of rotation of the shutter plate 5 is slowed in order to provide a period of constant pressure at the outlet port 35. FIG. 7(d) illustrates a square waveform, which waveform can be achieved by operation of the valve in the manner described above for achieving a trapezoidal waveform, except that the blower is configured to develop a higher pressure than is actually required, that is an over-pressure, whereby the over-pressure provides for an instantaneous increase/decrease in pressure to the desired maximum/minimum level in order to provide for the sharp transition edges of the square pulses. It will of course be understood by a person skilled in the art that the above-described waveforms could be achieved by duty cycles other than 1:1 by selectively controlling the pressure developed by the blower.

The valve of the present invention can further be used to provide a pressure waveform in an entirely positive or negative pressure regime. This can be achieved by connecting one of a further positive or negative fluid pressure source to the ventilator apparatus and operating the valve as described above to produce the various waveforms. Alternatively, this can be achieved by alteration of the duty cycle. If the ventilator apparatus is to be operated entirely in a positive pressure regime the ratio of the time in which the positive pressure source is connected to the outlet port 35 in relation to the time in which the negative pressure source is connected to the outlet port 35 would be increased, and vice versa for operation entirely in a negative pressure regime.

The valve of the present invention yet further provides for operation in either a continuous positive or negative pressure mode. This is achieved by positioning the shutter plate 5 in the above-described one-eighth and five-eighth or three-eighth and seven-eighth turn positions, whereby the outlet port 35 communicates with the respective one of the inlet or outlet of the blower. Moreover, if necessary, the shutter plate can be operated in an oscillating mode, wherein the direction of the shutter plate 5 is continually reversed to provide connection to the positive and negative pressure fluid sources in the manner of the known prior art.

It will be understood that the valve of the present invention can find application not only in providing an alternating positive and negative fluid pressure source to a ventilator apparatus, but can be employed in many other applications, such as in a resuscitation or physiotherapy apparatus where an alternating positive and negative pressure source is required.

FIG. 8 illustrates a ventilator apparatus incorporating an oscillator in accordance with an embodiment of the present invention. The ventilator apparatus includes an enclosure 102 for receiving the trunk of a patient. In this embodiment the enclosure 102 comprises a base plate 104 on which a patient is provided and a cover member 106 of a generally flattened U-shape which is located over the trunk of the patient. The cover member 106 has open ends through which pass the body of the patient. Each open end is provided with a sealing member 108 in the form of a pleated rubber curtain fixed to the sides of the cover member 106. The cover member 106 is detachable from the base plate 104 by quick release latches 110 positioned on each longitudinal side of the cover member 106. A pair of air inlet/outlet ports 112 are provided in the cover member 106 and above the upper chest region of the patient.

The ventilator apparatus further includes an oscillator 116. The oscillator 116 comprises first and second pressure waveform generating devices 118,120 which are each commonly connected by tubing 122 to the enclosure 102. Each of the waveform generating devices 118,120 comprises a blower 150 which provides a positive and a negative fluid pressure source, and a fluid control valve 160 which is connected between the inlet 150a (negative pressure side) and the outlet 150b (positive pressure side) of the blower 150. The outlet ports 160a of each of the valves 160 are coupled together and connected via the tubing 122 to the ports 112 in the enclosure 102. In an alternative embodiment, the outlet ports 160a of the valves 160 may be connected separately to the ports 112 in the enclosure 102. The first waveform generating device 118 generates a cyclic pressure waveform. The second waveform generating device 120 generates a pressure waveform of positive pulses of higher frequency and lower amplitude than the first pressure waveform. Together the first and second waveform generating devices 118,120 provide the required pressure waveform comprising a first, base cyclic waveform having a second waveform of positive pulses of higher frequency superimposed thereon. The oscillator 116 further comprises control circuitry 124 to control the amplitude, frequency and shape of the first and second pressure waveforms developed by the waveform generating devices 118,120, and accordingly the characteristics of the superimposed pressure waveform.

The operation of the oscillator 116 will be described in more detail hereinbelow. In this embodiment, each of the fluid control valves 160 of the first and second waveform generating devices 118,120 is of the kind described in relation to FIGS. 1 to 6.

In use, the oscillator 116 provides a pressure waveform which comprises a first, base cyclic waveform (see FIG. 9(a)) having a second higher-frequency waveform of positive pulses (see FIG. 9(b)) superimposed thereon. The required pressure waveform which comprises the two waveforms superimposed is achieved by the summation of the first and second waveforms. This superimposed waveform is represented in FIG. 9(c). FIG. 9(a) illustrates the pressure waveform which is developed by the first waveform generating device 118 when the valve 160 of that device is operated at a duty cycle of 1:1 and at continuous fixed speed as described in relation to FIG. 7(*a*). FIG. 9(*b*) illustrates the pressure waveform which is developed by the second waveform generating device 120 when the valve 160 of that device is operated at a duty cycle of up to typically 100:1 at a speed ten times greater than the speed of the valve 160 of the first waveform generating device 118, and when the blower of the second waveform generating device 120 is operated to provide a waveform having an amplitude of only 20% of the base waveform developed by the first waveform generating device 118. Alternatively, the second pressure waveform could be achieved by a waveform generating device comprising simply a blower to the outlet of which is connected an "on-off" type valve for generating the positive pulses. FIG. 9(*c*) illustrates the pressure waveform developed when the waveforms generated by the first and second waveform generating devices 118,120 are superimposed.

It will be understood that FIG. 9(*c*) represents only one example of the pressure waveform which can be achieved by the oscillator 116 of the present invention. The oscillator 116 of the present invention can, by controlling each of the waveform generating devices 118,120, provide any required shape of superimposed waveform. Examples of the further waveforms which can be achieved, namely saw-tooth, trapezoidal and square/rectangular, have been described hereinabove.

It will also be understood by a person skilled in the art that the amplitude and frequency of the component waveforms generated by the waveform generating devices 118, 120 will be selected according to the particular ventilation requirements. However, in normal operation, the frequency of the second higher-frequency pressure waveform will usually be from 5 to 100 times higher than that of the base waveform, and the amplitude of the second higher-frequency waveform will usually be from 10 to 50% of the amplitude of the base waveform.

It will be further understood by a skilled person in the art that the oscillator of the present invention, although described in the specific embodiment in relation to a cuirass, can be employed in any ventilation technique, be it a positive or negative pressure ventilation technique.

What is claimed is:

1. A valve for controlling gas flow to ventilator or physiotherapy apparatus, comprising a body having first and second inlet ports and an outlet port, and a single shutter plate rotatable with respect to the body, the body comprising a first body portion defining the inlet ports and a second body portion defining the outlet port, and the first body portion defining two chambers, each in communication with a respective one of the inlet ports, wherein the single shutter plate is operable on rotation in a single sense to alternately open the first inlet port and the second inlet port to the outlet port, wherein the single shutter plate is generally circular and has a central axis of rotation, and wherein the single shutter plate defines at least two plate openings and each chamber has two further openings such that when the single shutter plate connects one inlet port to the outlet port, the single shutter plate connects the respective other inlet port to the outside of the valve.

2. The valve of claim 1, wherein the further chamber openings are spaced such that upon one full rotation of the single shutter plate, the first inlet port is coupled to the outlet port, the second inlet port is coupled to the outlet port, the first inlet port is coupled again to the outlet port and the second inlet port is coupled again to the outlet port.

3. The valve claim 1, wherein each plate opening substantially corresponds with each chamber opening.

4. The valve of claim 1, wherein the plate openings are sector-shaped openings.

5. The valve of claim 1, wherein the first body portion has a face wall portion having the openings, the face wall portion having land portions between the openings.

6. The valve of claim 5, wherein the body has a circular flange upstanding around the face wall portion, the depth of the flange corresponding substantially to a thickness of the shutter plate, and the diameter of the flange corresponding to that of the shutter plate.

7. The valve of claim 5, wherein the land portions are dimensioned and disposed so that in at least one position of the shutter plate, communication between the inlet ports and the outlet port is prevented.

8. The valve of claim 1, wherein the shutter plate has a first position where the first inlet port is coupled to the outlet port, a second position where the second inlet port is connected to the outlet port and a third position intermediate the first and second positions where neither inlet port is coupled to the outlet port.

9. The valve of claim 8, wherein in the third position of the shutter plate, the outlet port is substantially closed.

10. The valve of claim 1 further comprising a shaft secured to the shutter plate, for rotation thereof.

11. The valve of claim 10 and further comprising an electric motor for driving the shaft.

12. The valve of claim 11, wherein the electric motor is a stepper motor.

13. The valve of claim 11, wherein the electric motor is a servomotor.

14. The valve of claim 11, further comprising control circuitry for the electric motor.

15. The valve of claim 14, wherein the control circuitry has means for varying the relationship between the time for which one inlet port is connected to the outlet port and the time for which the other inlet port is connected to the outlet port.

16. The valve of claim 14, wherein the control circuitry has means for varying the speed of rotation of the shutter plate.

17. A valve for controlling gas flow to ventilator or physiotherapy apparatus, comprising a body having first and second inlet ports and an outlet port, and a single shutter plate rotatable with respect to the body and adapted selectively to interconnect the inlet ports to the outlet port, whereby the single shutter plate is operable on rotation in a single sense to connect alternately the first inlet port to the outlet port and the second inlet port to the outlet port, and the body comprises a first body portion defining the inlet ports and a second body portion defining the outlet port, and the first body portion defines two chambers, each in communication with a respective one of the inlet ports, each chamber having a respective opening, and the shutter plate cooperates with the openings to effect connection of the outlet port and the inlet ports, and the shutter plate is generally circular, has a central axis of rotation, and defines at least two plate openings for cooperation with the openings of the body, whereby communication between the outlet port is established with the inlet ports, and each plate opening substantially corresponds with each chamber opening.

18. A valve for controlling gas flow to ventilator or physiotherapy apparatus, comprising a body having first and second inlet ports and an outlet port and a shutter plate rotatable with respect to the body and adapted selectively to interconnect the inlet ports to the outlet port, with the shutter plate operable on rotation in a single sense to connect alternately the first inlet port to the outlet port and the second inlet port to the outlet port, and wherein upon one full rotation of the shutter plate, the first inlet port is coupled to the outlet port, the second inlet port is coupled to the outlet port, the first inlet port is coupled again to the outlet port and the second inlet port is coupled again to the outlet port, wherein the body comprises a first body portion defining the inlet ports and a second body portion defining the outlet port, wherein the first body portion defines two chambers, each in communication with a respective one of the inlet ports, each chamber having a respective opening, and the shutter plate cooperates with the openings to effect connection of the outlet port and the inlet ports, and wherein the shutter plate is generally circular, has a central axis of rotation, and defines at least two plate openings for cooperation with the openings of the body, with communication between the outlet port established with the inlet ports.

19. Apparatus for use in the ventilation of the lungs of a patient, comprising an enclosure for receiving at least the chest region of the patient's body, at least one blower and a valve for controlling gas flow to ventilator or physiotherapy apparatus, comprising a body having first and second inlet ports and an outlet port, and a single shutter plate rotatable with respect to the body, the body comprising a first body portion defining the inlet ports and a second body portion defining the outlet port, and the first body portion defining two chambers, each in communication with a respective one of the inlet ports, whereby the single shutter plate is operable on rotation in a single sense to alternately open the first inlet port and the second inlet port to the outlet port, and the single shutter plate is generally circular and has a central axis of rotation, characterized in that the single shutter plate defines at least two plate openings and each chamber has two further openings such that when the single shutter plate connects one inlet port to the outlet port, the single shutter plate connects the respective other inlet port to the outside of the valve.

20. An oscillator for producing a pressure waveform, comprising a waveform generating means for producing a first, base cyclic pressure waveform having a second pressure waveform of positive pressure pulses of higher frequency superimposed thereon, wherein the waveform generating means comprises a first apparatus comprising an enclosure for receiving at least the chest region of the patient's body, at least one blower and a valve for controlling gas flow to ventilator or physiotherapy apparatus, comprising a body having first and second inlet ports and an outlet port, and a single shutter plate rotatable with respect to the body, the body comprising a first body portion defining the inlet ports and a second body portion defining the outlet port, and the first body portion defining two chambers, each in communication with a respective one of the inlet ports, whereby the single shutter plate is operable on rotation in a single sense to alternately open the first inlet port and the second inlet port to the outlet port, and the single shutter plate is generally circular and has a central axis of rotation, characterized in that the single shutter plate defines at least two plate openings and each chamber has two further openings such that when the single shutter plate connects one inlet port to the outlet port, the single shutter plate connects the respective other inlet port to the outside of the valve for producing the first pressure waveform, and a second apparatus comprising an enclosure for receiving at least the chest region of the patient's body, at least one blower and a valve for controlling gas flow to ventilator or physiotherapy apparatus, comprising a body having first and second inlet ports and an outlet port, and a single shutter plate rotatable with respect to the body, the body comprising a first body portion defining the inlet ports and a second body portion defining the outlet port, and the first body portion defining two chambers, each in communication with a respective one of the inlet ports, whereby the single shutter plate is operable on rotation in a single sense to alternately open the first inlet port and the second inlet port to the outlet port, and the single shutter plate is generally circular and has a central axis of rotation, characterized in that the single shutter plate defines at least two plate openings and each chamber has two further openings such that when the single shutter plate connects one inlet port to the outlet port, the single shutter plate connects the respective other inlet port to the outside of the valve for producing the second pressure waveform.

21. A valve for controlling gas flow to ventilator or physiotherapy apparatus, comprising a body having first and second inlet ports and an outlet port and a shutter plate rotatable with respect to the body and adapted selectively to interconnect the inlet ports to the outlet port, whereby the shutter plate is operable on rotation in a single sense to connect alternately the first inlet port to the outlet port and the second inlet port to the outlet port, and wherein upon one full rotation of the shutter plate, the first inlet port is coupled to the outlet port, the second inlet port is coupled to the outlet port, the first inlet port is coupled again to the outlet port and the second inlet port is coupled again to the outlet port, wherein the shutter plate is generally circular, has a central axis of rotation, and defines at least two plate openings for cooperation with the openings of the body, whereby communication between the outlet port is established with the inlet ports.

* * * * *